April 2, 1940. E. H. STEEDMAN 2,195,877
SHAFT SEALING DEVICE
Filed April 8, 1936 2 Sheets-Sheet 1

INVENTOR.
EDWIN H. STEEDMAN
BY Roy M. Eilers
ATTORNEY.

April 2, 1940.  E. H. STEEDMAN  2,195,877
SHAFT SEALING DEVICE
Filed April 8, 1936  2 Sheets-Sheet 2
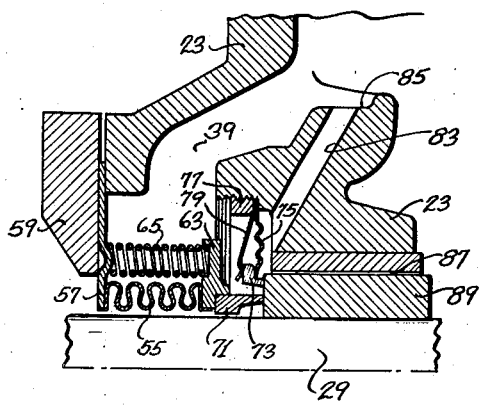
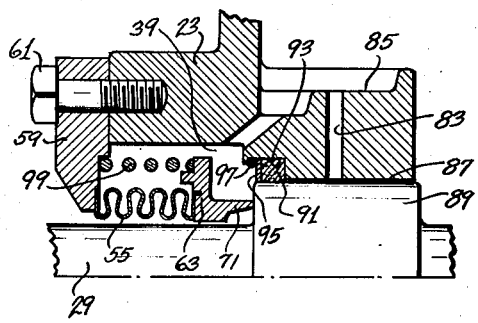
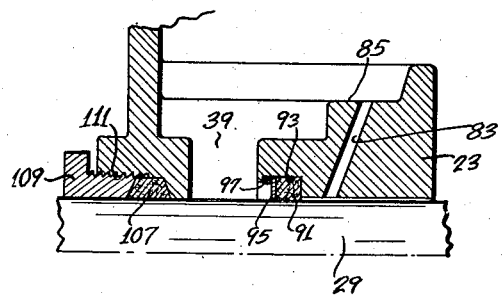
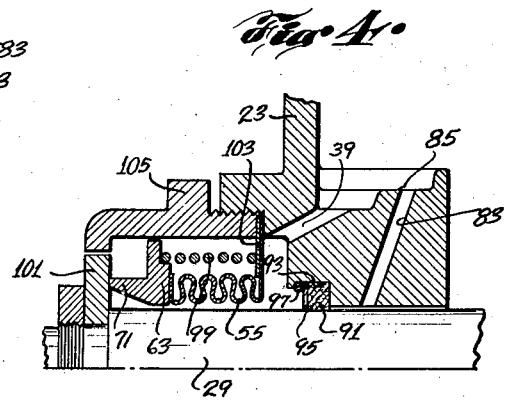
INVENTOR.
EDWIN H. STEEDMAN
BY
ATTORNEY.

Patented Apr. 2, 1940

2,195,877

UNITED STATES PATENT OFFICE 2,195,877

SHAFT SEALING DEVICE

Edwin H. Steedman, St. Louis, Mo., assignor to Curtis Manufacturing Company, Wellston, Mo., a corporation of Missouri Application April 8, 1936, Serial No. 73,281

8 Claims. (Cl. 286—11)

This invention relates to shaft sealing devices such as are used to maintain a gas tight joint between a shaft and an associated casing.

The problem of an efficient shaft seal accompanies the design of many different machines, particularly refrigerator compressors, gas compressors and the like. Many such sealing devices are such as to expose the packed or sealing joint to gas pressure so that any leakage in or through the joint will be of gas. Where the sealing joint includes relatively movable sealing surfaces, it is difficult to make a perfect contact therebetween that will remain gas tight for a long period of time, especialy when the associated machine is subjected to intermittent operation. Where the coacting sealing surfaces are at all times covered with oil or other sealing fluid, undue wear of the surfaces is prevented and any leakage past the joint must be of oil or sealing fluid rather than gas, and since a sealing joint can be made fluid tight with little difficulty, any leakage between the surfaces will be prevented.

To insure satisfactory operation of sealing surfaces in a device where the normal oil level is below the level of the sealing surfaces, it is necessary to provide a sufficient amount of sealing fluid or oil to cover the sealing surface at all times, including periods when the device is not operating.

Thus one of the objects of the present invention is to provide a shaft sealing device in an appliance having the internal oil supply level below that of the shaft with means for submerging the sealing device with oil at all times.

This is accomplished in the present invention by providing an auxiliary sealing device which with the main sealing device will form a pocket for oil or sealing fluid which may be supplied from a reservoir.

Another object of this invention is to provide main and auxiliary shaft sealing devices which are actuated independently of each other so that wear of one will not affect the operation of the other and so that the design of the sealing members is not limited by the requirement of equal wearing properties.

Another object of this invention is to provide the necessary oil pockets around the main shaft sealing surfaces so that any leakages therethrough will be of oil rather than air or gas.

Another object of this invention is to provide a sealing device whose rubbing or bearing surfaces will maintain close and tight contact even after considerable wear.

Other objects and advantages as well as the method of accomplishing the above set forth objects wil appear from the following detailed description.

The accompanying drawings illustrate several forms of the invention and a description of the same will follow, it being understood that the invention is also capable of embodiment in numerous modified and amplified forms falling within the scope of the appended claims.

In the drawings:

Fig. 2 is a fragmentary sectional view of a modified form of my shaft sealing device.

Fig. 3 is a fragmentary view, in section, of a modified form of my shaft sealing device.

Fig. 4 is a fragmentary view, in section, of another modification embodying my invention, and Figs. 5 and 6 are fragmentary views, in section, of still further modifications of shaft sealing devices embodying my invention.

Figure 1:
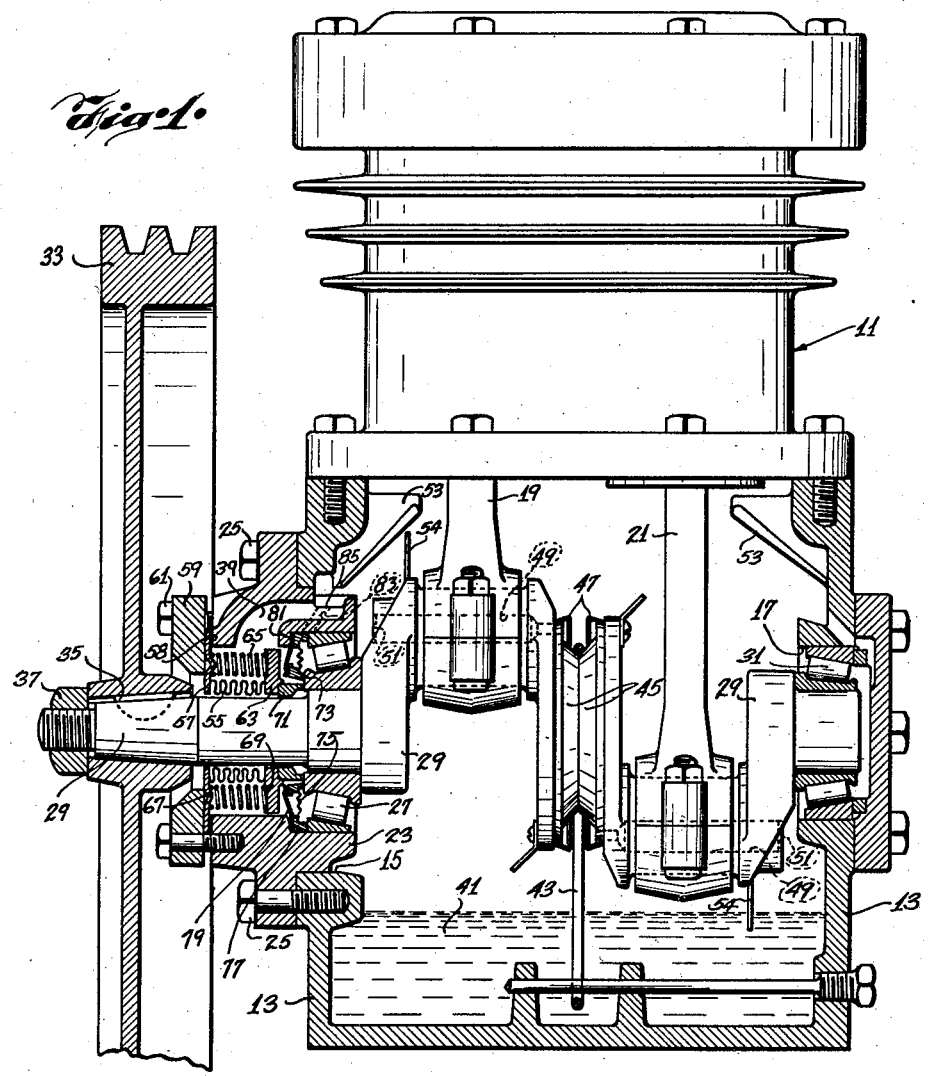
Figure 1 is a view partially in vertical section and partially in front elevation, of a compressor embodying my improved shaft sealing device.

Referring first to Fig. 1 of the drawings, I have there illustrated a compressor designated generally by the numeral 11 and comprising a crankcase 13 having an opening 15 in one of its walls and a second opening 17 in its opposite wall. The numerals 19 and 21 designate connecting rods of the usual form.

Opening 15 in one wall of the casing has located therein a bearing support member 23 which may be of substantially annular shape and fastened against the casing over the opening 15 by a plurality of short cap screws 25. The bearing support 23 is so designed as to receive and hold a roller bearing 27. While I have illustrated a specific form of roller bearing, the design and construction thereof form no part of my present invention. A crank shaft 29 is located within the crankcase and has one end thereof supported by the above described roller bearing, the inner race of the roller bearing being adapted to be forced on the crank shaft so as to form a gas tight joint. The other end of the crank shaft may be supported by a second roller bearing 31 which is located in the opening 17 in the other wall of the casing and which is held in proper operative position by any suitable means.

Means for driving the crank shaft may comprise a pulley 33 mounted on a tapering portion of the crank shaft and held against rotation by a key 35 and a locking nut 37.

An oil retaining pocket 39 is provided for the purpose of supplying oil from the crank case oil supply 41 to the shaft sealing device yet to be described. Any desirable means may be employed for elevating a sufficient quantity of oil from the crank case oil supply to the oil retaining pocket. Fig. 1 shows an oil ring 43 which rotates with the crank shaft and delivers oil to the adjoining control surfaces 45 of the crank shaft. Centrifugal force causes this oil to travel outwardly on the control surface and then to be trapped inside of the annular washer 47. The oil then travels through the passage 49, the excess of oil not used for lubricating the connecting rod is thrown out of the open end of the passage through a hole 51 and onto a projection 53 of the crank case from where it drips into the oil retaining pocket 39. This method of delivering oil to the pocket is not claimed as a part of this invention, it being understood that any method of delivering oil from the crank case to the oil pocket may be used without departing from this invention. Another satisfactory method of supplying oil to the pocket would be to provide the crank shaft with a blade like projection 54 which would throw oil from the crank case onto the projection 53.

The main shaft sealing device is provided for the pulley end of the crank shaft and will now be described. The numeral 55 designates a flexible metal bellows having its outer end secured in an oil and gas tight manner as by brazing to an annular plate 57. A gasket 58 forms a gas and oil tight joint between the plate 57 and the member 23 when annular member 59 is drawn against it by cap screws 61. The inner end of the flexible metal bellows is similarly secured to annular member 63 which may be composed of any suitable metal. A plurality of helical compression springs 65 may extend between the metal plate 57 and the member 63, small projections 67 and the recesses 69 being provided to maintain the helical springs in proper operative positions. Any other suitable form of spring means may be used if desired. One end of an annular sealing member 71, which may be of the shape shown in Fig. 1 and of any suitable material, cooperates with the annular member 63 to form a gas tight joint. The member 71 may be formed integral with the member 63 if desired. The other end of the sealing member 71 is pressed against the inner race of the roller bearing 27 by the action of the springs 65 to form the main sealing surface.

An auxiliary pair of sealing surfaces is formed by an annular member 73, whose shape in cross section may be substantially that shown in Fig. 1 and whose diameter may be slightly greater than that of member 71, and the surface of the inner race of the roller bearing. The member 73 is secured in a gas tight manner, as by brazing, to the inner edge of a resilient corrugated annulus 75 whose outer edge is similarly secured to a ring member 77. A means for maintaining close operative rubbing engagement between the annular member 73 and the inner race of the roller bearing may comprise a spring plate 79 whose outer diameter is substantially the same as the outer diameter of ring 77. The assembly comprising members 73, 75, 77 and 79 may be held in their proper operative positions by being clamped between an overhanging shoulder 81 of member 23 and the outer race of the roller bearing. I have merely illustrated one form or means for holding the auxiliary sealing device and do not wish to be restricted thereto since other structures effective for the same purpose may be employed without departing from the scope of the invention.

It can be seen from the drawings that an oil reservoir or pocket will be formed by the members 57, 55, 63, 71, 73, 75, 77, 81 and the inner race of the roller bearing, into which oil from the oil retain pocket 39 can flow and be retained. The space provided for the storage of the oil is relatively large due to the construction employed insuring a surplus of oil around the sealing surfaces even though some may leak back into the crank case or be forced out due to gas or air pressure.

An oil duct 83 may be drilled angularly from the surface 85 and allows oil in the retaining pocket 39 above the level of surface 85 to flow down and around the auxiliary sealing member 73 and to run out through the roller bearing and into the crank case.

As described the sealing members 71 and 73 are pressed against a cooperating contact surface as the inner race of a roller bearing by independent or individual holding means, causing the operation of each pair of sealing surfaces to be independent of the other pair. This is especially advantageous if one of the sealing members wears more than the other for both of the sealing devices will continue to operate satisfactorily which they would not do if they were formed integral with each other.

While Fig. 1 illustrates a form of my invention as applied to a device using roller bearings as a crank shaft supporting means, the other figures show a form of the invention as applied to a plane bearing. The numerals employed in the description of Fig. 1 designate similar parts in the other figures. Fig. 2 shows a form of the invention utilizing an end of an enlarged portion of the crank shaft as a cooperating contact surface for the sealing members. The numeral 87 denotes a bearing surface which cooperates with the bearing surface of the enlarged portion 89 of the crank shaft to form a suitable crank shaft support. The enlarged portion 89 of the crank shaft may be an annular member driven onto the crank shaft or an enlarged portion formed integral with the crank shaft. In Fig. 2 the sealing members 71 and 73 may cooperate with the contact surface on the end of the enlarged portion of the crank shaft to form main and auxiliary sealing surfaces which form a pocket therebetween to retain a supply of oil.

Another form of the invention is shown in Fig. 3 where a different type of auxiliary sealing member is shown. The auxiliary sealing member 91 may be of any resilient packing material such as felt or treated rope and is held in a recess 93 of the crank case by an annular plate 95 and a spring ring 97. In Fig. 3 this auxiliary sealing member cooperates with the bearing surface of the enlarged portion of the crank shaft to form an auxiliary sealing surface. The main sealing surface is formed as in Fig. 2 and, with the auxiliary sealing surface, forms a pocket to retain a supply of oil. A single spring 99 which may be used in any of the other forms of the invention instead of the plurality of springs previously shown, is shown in this drawing with the form of the annular member 63 changed to accommodate the single spring.

In the form of the invention shown in Fig. 4, the contact surface includes the inner face of the annular member 101 which may be secured to the crank shaft in any suitable manner. The metallic bellows and spring are similar to those used in Fig. 3 and are supported by a ring 103 clamped into position by an annular clamping member 105. The auxiliary sealing member is similar to the one shown in Fig. 3, but here makes rubbing contact with the bearing surface of the crank shaft, as no enlarged portion of the crank shaft need be used in this form of the invention. The auxiliary sealing member as before forms a pocket with the main sealing member and the contact surface to retain a supply of oil or sealing fluid.

Fig. 5 shows a form of the invention wherein an annular resilient gasket 107 may be used as a main sealing member. It may be composed of any suitable material such as leaded or treated rope and is pressed into rubbing contact with the surface of the crank shaft by a clamping ring 109 which may screw into a recess 111 in the crank case which also serves to hold the main sealing member. The auxiliary sealing member shown here may be similar to the type shown in Fig. 4.

The above described forms of the invention provide satisfactory shaft sealing devices adaptable to a compressor having a crank case pressure which greatly exceeds the external or atmospheric pressure or one in which the crank case pressure is lower than atmospheric. With the internal pressure greatly in excess of the external pressure, any opening between the main sealing surfaces will be instantly filled with oil since the oil pocket is subject to the internal crank case pressure. As it is easy to seal the surfaces from an oil leakage, the oil will not pass through the opening to the outside in any large amounts and thus any leakage of gas is prevented. With an internal pressure slightly lower than the external pressure, the capillary attraction between the main sealing surfaces will be adequate to maintain a film of oil therebetween to prevent leakage into the crank case. When the internal pressure is appreciably less than the external or atmospheric pressure, the capillary attraction will not be great enough to counteract the centrifugal and atmospheric forces on the film of oil between the main sealing surfaces and the sealing surfaces would soon become dry, allowing air to leak into the crank case.

Figure 6:
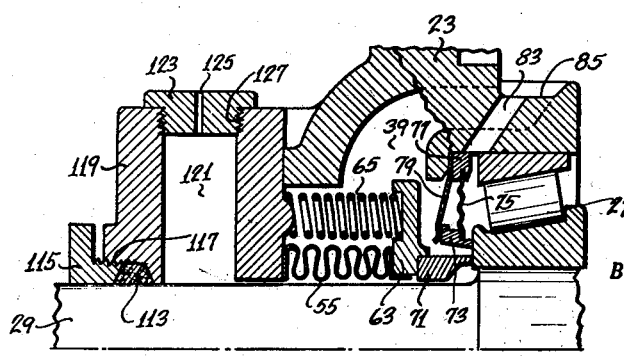

When it is desired to seal the shaft passing into a crank case with a high negative internal pressure with respect to the external pressure, a form of the invention as shown in Fig. 6 may be used. In Fig. 6 the main and auxiliary sealing surfaces are similar to those shown in Fig. 1. In addition an external auxiliary sealing member 113 is provided. This sealing member may be of any suitable material such as leather or felt and may be held in position by a clamping or holding ring 115. The clamping ring may be screwed into a recess 117 in an annular casing 119 which may be formed integral with the ring 59 or formed separately and secured thereto in any suitable manner. It is obvious that in place of the type of packing shown, any other sealing means for holding oil in pocket 121 may be employed to effect the same purpose. An external oil pocket 121 is thus formed between the main sealing member and the external auxiliary sealing member. An oil cap 123 provided with a hole 125 therein is provided for an opening 127 in the annular casing. The external oil pocket may be filled with oil or sealing fluid through this opening. An external oil pocket of suitable form may be used with any of the forms of the invention previously described.

It can be seen that the external oil pocket is subject to pressure conditions external to the crank case due to the hole in the oil cap while the internal oil pocket is subject to pressure conditions inside of the crank case. If the external crank case pressure greatly exceeds the internal pressure, any space between the main sealing surface will be immediately filled with oil from the external pocket due to the pressure difference and thus since an oil seal is readily formed by the sealing surfaces, any leakage therethrough will be very slight or totally prevented. The internal oil pocket functions as described before should the internal crank case pressure exceed the external crank case pressure.

It will be noted that in all forms of the invention shown, the so-called main and auxiliary sealing members are pressed against the surface with which they coact by independent means. Thus even though one of the sealing members should wear more than the others, all members will nevertheless maintain tight rubbing contact with the coacting surfaces. There will likewise be no tendency for one member to warp due to wear of the other member which would occur were they formed on the same member with the oil pocket between. The independent actuation of the sealing members also makes it possible to use different materials in the construction of each if so desired.

While the above description and drawings illustrate several forms of the invention, it is to be understood that it is capable of embodiment in numerous other forms within the scope of the appended claims.

I claim:

1. A sealing device to prevent leakage between a shaft and an enclosed casing comprising two sealing members, a contact surface adapted to cooperate in rubbing engagement with the sealing members, individual resilient holding means for each sealing member to maintain it in rubbing engagement with the contact surface, a pocket adapted to retain a fluid between the sealing members, a passage between the pocket and the casing and means to keep said pocket supplied with fluid from said casing.

2. A shaft-sealing device to prevent leakage between an opening in an enclosed casing and a shaft, comprising two sealing members, a contact surface for cooperation with the sealing members, individual resilient holding means for each sealing member to maintain it in rubbing engagement with the contact surface, said resilient holding means allowing independent movement of each sealing member, a pocket including the space between said sealing members, a passage between the pocket and the enclosed casing and means to supply said pocket with sealing fluid.

3. A shaft-sealing device to prevent leakage between a shaft and an enclosed casing comprising two annular sealing members surrounding the shaft, a contact surface rotatable with the shaft and positioned to cooperate with both of the sealing members, a plurality of springs positioned around each sealing member to maintain it in rubbing engagement with the contact surface, a pocket communicating with the space between the two sealing members and adapted to retain a supply of fluid, a passage between the pocket and the enclosed casing and means to supply the pocket with fluid from the enclosed casing.

4. In a compressor or the like, a rotatable shaft, a casing provided with an opening through which the shaft extends, an oil reservoir in the casing below the shaft, a bearing for the shaft including a fixed part carried by the casing at the opening and a rotating part carried by the shaft, two annular sealing members positioned around the shaft, a contact surface on the rotating bearing part, individual resilient means for each sealing member to maintain it in engagement with the contact surface to form a seal, an oil pocket adjacent the opening around the shaft and including the space between the sealing members, a passage between the oil pocket and the casing and means to supply oil to the pocket from the oil reservoir to completely cover the seals at all times.

5. In a compressor or the like, a rotatable shaft, a casing provided with an opening through which the shaft extends, an oil reservoir in the casing below the shaft, two annular sealing members around the shaft, a contact surface for cooperation with the sealing members, individual resilient holding means for maintaining each sealing member in engagement with the contact surface to form a seal, a flexible member extending between each sealing member and the casing, an oil pocket adjacent the opening around the shaft including the space between the sealing members and the flexible members, a passage between the oil pocket and the casing and means to supply oil to the pocket to cover the seals.

6. In a compressor or similar machine, the combination of a crankshaft, a crankcase having an opening in one of its walls through which said crankshaft passes, a contact surface rotatable with said crankshaft, two concentric sealing members encircling the shaft and engaging the contact surface, an individual springing means for each sealing member to maintain it in engagement with the contact surface, a bellows surrounding the shaft and attached to one end by a gas tight connection to the inner sealing member and at the other end by a gas tight connection to the crankcase, a gas tight connection between the other sealing member and the crankcase, an oil pocket formed by the contact surface, the two sealing members, the bellows, and the gas tight connection, a passage between said oil pocket and the crankcase and means to keep said oil pocket supplied with oil from the crankcase.

7. In a compressor or similar machine, the combination of a crankshaft, a crankcase having an opening in one of its walls through which said crankshaft passes, a contact surface rotatable with the crankshaft, two concentric sealing members encircling the shaft and engaging the contact surface, a plurality of springs arranged around the inner sealing member for maintaining it in engagement with the contact surface, spring means for maintaining the outer sealing member in engagement with the contact surface, a flexible gas tight connection between each of the sealing members and the crankcase, an oil pocket formed by the contact surface and the two sealing members and their respective gas tight connections, a passage between the crankcase and the oil pocket and means to keep the oil pocket supplied with oil from the crankcase.

8. In a compressor or similar machine, the combination of a crankshaft, a crankcase having an opening in one of its walls through which said crankshaft passes, a rotating part carried by the shaft, two concentric sealing members encircling the shaft and engaging a contact surface on the rotating part, individual spring means for each sealing member to maintain it in engagement with the contact surface, a bellows surrounding the shaft and attached at one end by a gas tight connection to the inner sealing member and at the other end by a gas tight connection to the crankcase, a flexible diaphragm attached between the outer sealing member and the crankcase for a gas tight seal and an oil pocket formed by the contact surface, the two sealing members, the bellows, the flexible diaphragm, and the crankcase, a passage between said pocket and the crankcase, and means to keep said oil pocket supplied with oil from the crankcase.

EDWIN H. STEEDMAN.